United States Patent
Jiang et al.

(10) Patent No.: US 6,487,034 B1
(45) Date of Patent: Nov. 26, 2002

(54) WRITE HEAD FAULT DETECTION WITH SMALL THRESHOLD

(75) Inventors: Hong Jiang, Milpitas, CA (US); James Nodar, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/681,811

(22) Filed: Jun. 8, 2001

(51) Int. Cl.[7] .............................. G11B 5/02
(52) U.S. Cl. ..................... 360/68; 360/31; 360/66; 369/53.42; 340/652
(58) Field of Search ............... 327/495; 340/635, 340/652, 653; 324/212, 226, 609, 610, 522, 523, 509, 500, 537, 546, 525, 526, 210; 369/53.42, 53.38, 53.1; 360/31, 68, 46, 67, 66

(56) References Cited

U.S. PATENT DOCUMENTS

| | | | |
|---|---|---|---|
| 4,203,137 A | * 5/1980 | Beck et al. ................ 360/53 |
| 5,087,884 A | * 2/1992 | Brannon ................... 324/523 |
| 5,457,391 A | * 10/1995 | Shimizu et al. ............ 324/546 |
| 6,104,199 A | * 8/2000 | Sako ........................ 324/546 |

* cited by examiner

Primary Examiner—Alan T. Faber
(74) Attorney, Agent, or Firm—W. Daniel Swayze, Jr.; W. James Brady; Frederick J. Telecky, Jr.

(57) ABSTRACT

A circuit (50) and method are provided for generating a signal (84) indicating an open impedance fault of a coil (56) of a write head (18) of a mass data storage device (10). The circuit (10) includes a differential amplifier (51) with the electrical component (56) being connected as a load in a first leg thereof. An impedance element (64) is provided in a second leg of the differential amplifier (50), and a pair of bipolar transistors (52,54) are respectively connected in the first and second legs. The pair of bipolar transistors (52,54) have a constant bias voltage (Bias) applied to inputs thereof, and an output circuit is connected to an output node of the first leg of the differential amplifier (51).

26 Claims, 1 Drawing Sheet

WRITE HEAD FAULT DETECTION WITH SMALL THRESHOLD

BACKGROUND OF INVENTION

1. Field of Ivention

This invention relates to improvements in methods and apparatuses for dynamic information storage or retrieval, and more particularly to improvements in methods and circuitry for detecting electrical resistance in electronic components, especially for detecting faults in a write head of mass data storage devices, hard disk drives, or the like, particularly when the write head has an open fault while its electrical resistance is still relatively small.

2. Relevant Background

Mass data storage devices include tape drives, as well as hard disk drives that have one or more spinning magnetic disks or platters onto which data is recorded for storage and subsequent retrieval. Hard disk drives may be used in many applications, including personal computers, set top boxes, video and television applications, audio applications, or some mix thereof. Many applications are still being developed. Applications for hard disk drives are increasing in number, and are expected to further increase in the future.

Typically, mass data storage devices include a data transducer, or head, that is used to read data from and write data to a rotating magnetic media, usually in the form of a disk or platter on which a material containing orientable magnetic domains is carried. The write head portion of the head mechanism of the type to which the present invention pertains has a coil through which write currents are passed to create a magnetic field adjacent the disk to selectively orient the magnetic domains of the magnetic material on the disk. The impedance of the coil is generally in the range of between about 15 and 30 ohms.

Sometimes, however, the head mechanisms experience faults, the faults of interest herein being an open fault and a short fault. Efforts have been made to detect such open and short faults; however, such efforts have required relatively complicated circuitry, and generally have required a considerable impedance change in the open direction before the fault could be detected.

In the past, circuits used to detect an open condition of the coil of the head included a circuit having first and second current paths with the coil connected between the control elements, for example, the bases, of the current controlling devices in each path. The output was applied to control the differential currents in a differential amplifier, which produced an output fault—indicating signal if the currents became unbalanced beyond a predetermined limit. The complicated circuit used generally required a detection threshold for an open head fault of over 3000 ohms. When an open head fault appeared with a head resistance between about 150 to 3000 ohms, the pre-existing technique could not properly detect the fault.

In the case of a short to ground, the coil was connected in series with a pair of central transistors that produce currents that are mirrored in respective outer current mirror transistors. When the coil was shorted to ground, the current in the central transistors became large, which was mirrored in the outer mirror transistors to provide an indication of the short.

What is needed, therefore, is a relatively simple circuit and method for detecting open and short conditions in a circuit element, such as a data transducer or head, in which the open fault condition can be detected at a selectable detection threshold slightly above the normal impedance of the head.

SUMMARY OF INVENTION

In light of the above, therefore, it is an object of the invention to provide an improved circuit and method for detecting an open condition in a circuit element, such as a data transducer or head, or the like.

One of the advantages of the circuit used in accordance with a preferred embodiment of the invention is that an open head condition can be selectively established at a lower detection threshold than that of circuits used heretofore.

Another advantage of the circuit used in accordance with a preferred embodiment of the invention is that a fewer part count is required to implement the circuit.

These and other objects, features and advantages of the invention will be apparent to those skilled in the art from the following detailed description of the invention, when read in conjunction with the accompanying drawings and appended claims.

According to a broad aspect of the invention, a circuit is provided for generating a signal indicating an impedance fault of an electrical component. The circuit includes a differential amplifier with the electrical component being connected as a load in a first leg thereof. An impedance element is provided in a second leg of the differential amplifier, and a pair of bipolar transistors are respectively connected in the first and second legs. The pair of bipolar transistors have a constant bias voltage applied to inputs thereof, and an output circuit is connected to an output node of the first leg of the differential amplifier.

According to another broad aspect of the invention, a circuit is provided for generating a signal indicating an impedance fault of an electrical component. The circuit includes means for providing differential amplification in first and second differential current legs, the electrical component being connected as a load in the first differential current leg. Means are also included for providing a matching impedance in the second differential current leg. Active amplifier means having a constant bias applied to inputs thereof are provided in the first and second differential current legs for providing differential amplification of currents in the first and second differential current legs. Output circuit means are connected to an output node of the first differential current leg for providing the signal indicating an impedance fault of the electrical component.

According to yet another broad aspect of the invention, a method is presented for generating a signal indicating an impedance fault of an electrical component connected as a load in a first current leg. The method includes differentially amplifying currents in respective the first current leg and a second current leg with a fixed amplification value. A matching impedance is provided for the electrical component in the second current leg, and an output amplifier is provided at an output node of the first current leg for providing the signal indicating an impedance fault of the electrical component.

BRIEF DESCRIPTION OF DRAWINGS

The invention is illustrated in the accompanying drawings, in which.

In the various figures of the drawing, like reference numerals are used to denote like or similar parts.

DETAILED DESCRIPTION

Figure 1:
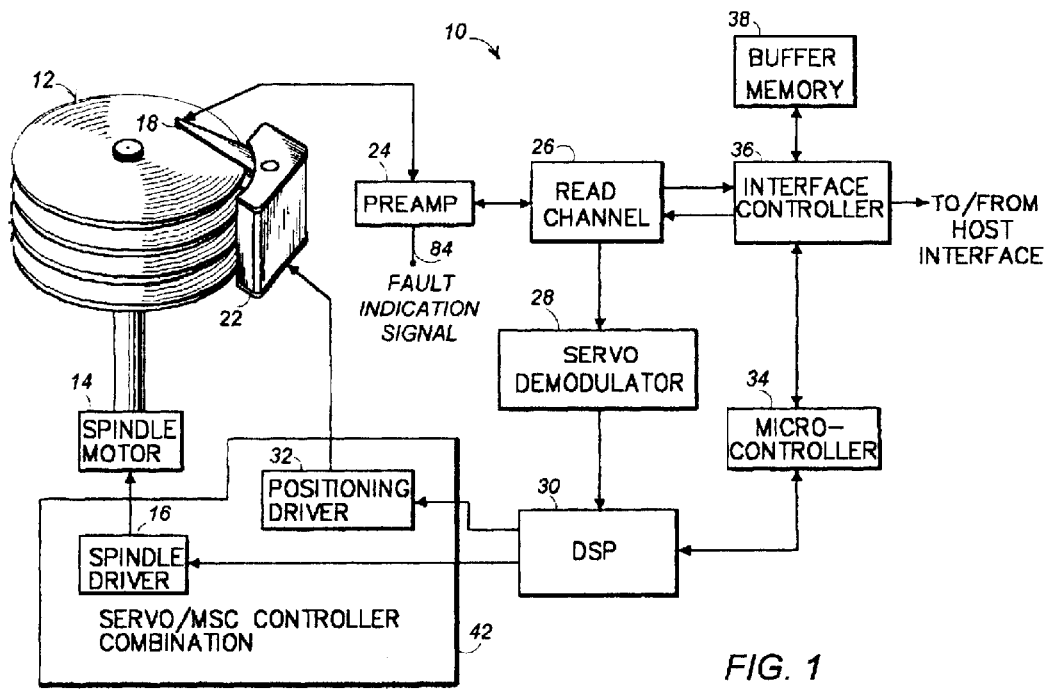
FIG. 1 is a block diagram of a generic disk drive system, illustrating the general environment in which the invention may be practiced.

The invention is illustrated in the accompanying drawings to which reference is now made. FIG. 1 is a block diagram of a generic disk drive system 10, which represents one general environment in which the invention may be practiced. The system 10 includes a magnetic media disk 12 that is rotated by a spindle motor 14 and spindle driver circuit 16. A data read/write transducer or head 18 is locatable along selectable radial tracks (not shown) of the disk 12 by a voice coil motor 22. The radial tracks may contain magnetic states that contain information about the tracks, such as track identification data, location information, synchronization data, as well as user data, and so forth. The head 18 is used both to record user data to and read user data back from the disk 12, as well as to detect signals that identify the tracks and sectors at which data is written, and to detect servo bursts that enable the head 18 to be properly laterally aligned with the tracks of the disk 12.

Analog electrical signals that are generated by the head 18 in response to the magnetic signals recorded on the disk 12 are preamplified by a preamplifier 24 for delivery to read channel circuitry 26. Servo signals, below described in detail, are detected and demodulated by one or more servo demodulator circuits 28 and processed by a digital signal processor (DSP) 30 to control the position of the head 18 via the positioning driver circuit 32. The servo data that is read and processed may be analog data that is interpreted by the DSP 30 for positioning the head 18.

A microcontroller 34 is typically provided to control the DSP 30, as well as an interface controller 36 to enable data to be passed to and from a host interface (not shown) in known manner. A data memory 38 may be provided, if desired, to buffer data being written to and read from the disk 12. Typically an "H-bridge" writer is used to drive the signals from the interface controller 36, read channel 26 and preamplifier 24 to be written to the head 18.

According to a preferred embodiment of the invention, open faults of the write head 18 can be reliably detected during operating modes other than a write mode of operation. Thus, when head resistance, which is normally in the range of about 15 to 30 ohms becomes larger than a predetermined resistance, such as 150 ohms, a fault indication signal is generated.

Figure 2:
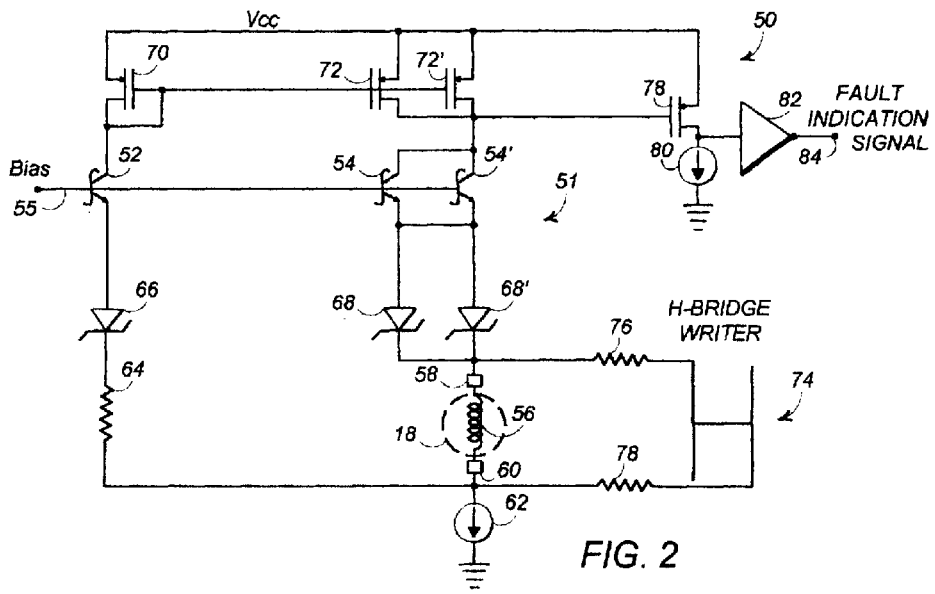
FIG. 2 is an electrical schematic diagram of a differential preamplifier circuit for use in detecting an open fault condition of a head transducer of a mass data storage device in conjunction with an "H-bridge" write head writer circuit, in accordance with a preferred embodiment of the invention.

A schematic diagram of a circuit 50, according to a preferred embodiment of the invention, for detecting open write head faults, is shown in FIG. 2, to which reference is now additionally made. The circuit 50, which may be included as a part of the preamplifier circuitry 24 shown in FIG. 1, is relatively simple in implementation, reliable in performance, and is flexible to enable the open head detection threshold to be selectively adjusted. The circuit uses relatively few components and consumes little power.

The circuit 50 includes a differential amplifier 51, which includes NPN transistors 52 and 54,54', each having a constant bias voltage applied to their bases on line 55. The coil 56 of the write head 18 is connected between pads 58 and 60 in a first leg of the differential amplifier 51, with a biasing current source 62 connected from one side of the write head coil to ground. A resistor 64 is connected in the second leg of the differential amplifier 51 to the biasing current source 62 to balance the impedance of the write head coil 56. Diodes 66 and 68,68' are also connected in the respective legs of the differential amplifier 51 to isolate the coil from the transistors 52 and 54,54', and current sourcing PMOS transistors 70 and 72,72' are provided on the topside of the differential transistors 52 and 54,54' to provide supply currents to the respective first and second current legs.

The drive signals are provided to the coil 56 of the write head 18 by an H-bridge writer 74, of known construction. Impedance matching resistors 76 and 78 are connected in series between respective opposite legs of the H-bridge writer 74 and opposite ends of the coil 56 of the write head 18. Thus, write currents are applied to the coil 56 by the H-bridge writer 74 in normal operation, such currents being isolated from the transistors 52 and 54,54' by the diodes 66 and 68,68' as mentioned above.

The fault indicating output of the circuit 50 is taken from the collector of the differential NPN transistors 54,54', to be detected, inverted, and amplified by a PMOS transistor 78. The drain of the PMOS transistor 78 is biased by a current source 80, and the fault output detected thereupon is applied to an inverter 82 for delivery on output line 84. In the circuit shown, the inverter 82 provides a digitized output signal on line 84 indicating the presence or absence of an open fault condition.

In operation, the value of the current that flows through the left leg of the differential amplifier 51 is established only by the bias voltage applied to the base of the NPN transistor 52. The voltage on the collector of the NPN transistor 52 is then applied to the gates of PMOS transistors 72 and 72' to provide a differential current in the right leg of the differential amplifier 51. This is established such that the bias applied to the gate of the PMOS transistor 78 normally holds the PMOS transistor in a conducting state.

If the coil 56 of the head 18 opens, or experiences a detectable increase in impedance, a lower differential current flows in the right leg of the differential amplifier 51, with most of the current flowing in the left leg. This raises the voltage on the gate of the PMOS transistor 78, causing it to turn off. This decreases the voltage on the input of the inverter 82, which is inverted at its output on line 84, to produce a high state signal thereat, signaling the open head condition.

It will be appreciated that by careful selection of the biasing of the various circuit components, and selection of the value of the resistor 84 the voltages at the input to the inverter 82 can be made to switch the output from its normal low voltage to a high value to indicate the open condition of the coil 56 of the head 18. It should be noted that although the term "open" is used, it does not necessarily mean that the impedance of the coil 56 is infinite. Thus, if the normal impedance of the coil 56 is in the range of about 15 ohms to about 30 ohms, the circuit 50 can be biased by selection of the value of resistor 84 to decrease the input voltage to the inverter 82 to a predetermined threshold voltage at a relatively low voltage level, compared to previous techniques. It has been found, for example, that a change in impedance of the coil 56 to only 150 ohms or more can be detected. Also, it will be appreciated by those skilled in the art that the circuit and method of this invention can also be applied to other fields where resistance detection is needed.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A circuit for generating a signal indicating an impedance fault of an electrical component comprising:
   a differential amplifier;
   said electrical component being connected as a load in a first leg of said differential amplifier;
   an impedance element in a second leg of said differential amplifier;
   a pair of bipolar transistors respectively connected in said first and second legs of said differential amplifier;
   said pair of bipolar transistors each having a same constant bias voltage applied to inputs thereof;
   and an output circuit connected to an output node of said first leg of said differential amplifier.

2. The circuit of claim 1 wherein said electrical component is a write head of a mass data storage device.

3. The circuit of claim 2 further comprising a writer circuit connected to said write head for providing write current values thereto.

4. The circuit of claim 3 wherein said writer circuit is an H-bridge writer.

5. The circuit of claim 1 further comprising a set of replicating elements in said first leg, each replicating element being connected in parallel with a corresponding element of said first leg.

6. A circuit for generating a signal indicating an impedance fault of an electrical component, comprising:
   a differential amplifier;
   said electrical component being connected as a load in a first leg of said differential amplifier;
   an impedance element in a second leg of said differential amplifier;
   a pair of bipolar transistors respectively connected in said first and second legs of said differential amplifier;
   said pair of bipolar transistors having a constant bias voltage applied to inputs thereof;
   and an output circuit connected to an output node of said first leg of said differential amplifier;
   wherein said output circuit comprises an output transistor connected to said output node, an output inverter having an input connected to receive an output of said output transistor, and a current source to bias said input of said output inverter to a predetermined quiescent voltage value.

7. The circuit of claim 6 wherein said output transistor is an MOS transistor.

8. The circuit of claim 6 further comprising a pair of diodes in series respectively with said first and second legs.

9. A circuit for generating a signal indicating an impedance fault of an electrical component, comprising:
   a circuit for providing differential amplification in first and second differential current legs;
   said electrical component being connected as a load in said first differential current leg;
   a circuit for providing a matching impedance in said second differential current leg;
   an active amplifier in said first and second differential current legs for providing differential amplification of currents in said first and second differential current legs;
   said active amplifier having a constant bias applied to inputs thereof;
   an output circuit connected to an output node of said first differential current leg for providing said signal indicating an impedance fault of said electrical component;
   wherein said output circuit comprises an active output amplifier device connected to said output node for detecting an output voltage at said output node, an output inverter having an input connected to receive an output of said output amplifier device for providing an output signal, and a current source for providing a current to bias said input of said output inverter to a predetermined quiescent voltage value.

10. The circuit of claim 9 wherein said electrical component is a write head of a mass data storage device.

11. The circuit of claim 10 further comprising a writer circuit means connected to said write head for providing write current values thereto.

12. The circuit of claim 11 wherein said writer circuit means is an H-bridge writer.

13. The circuit of claim 9 wherein said active amplifier means comprises a pair of bipolar transistors.

14. The circuit of claim 13 wherein said bipolar transistors are NPN transistors.

15. A circuit for generating a signal indicating an impedance fault of an electrical component, comprising:
   a circuit for providing differential amplification in first and second differential current legs;
   said electrical component being connected as a load in said first differential current leg;
   a circuit for providing a matching impedance in said second differential current leg;
   active amplifier in said first and second differential current legs for providing differential amplification of currents in said first and second differential current legs;
   said active amplifier having a constant bias applied to inputs thereof;
   an output circuit connected to an output node of said first differential current leg for providing said signal indicating an impedance fault of said electrical component;
   further comprising a set of replicating elements in said first current leg, each replicating element being connected in parallel with a corresponding element of said first current leg.

16. The circuit of claim 15 wherein said active output amplifier device means is an MOS transistor.

17. The circuit of claim 15 further comprising a pair of diode means in series respectively with said first and second current legs for isolating said active amplifier means.

18. A method for generating a signal indicating an impedance fault of an electrical component connected as a load in a first current leg, comprising:
   differentially amplifying currents in respective said first current leg and a second current leg with a fixed amplification value;
   providing a matching impedance for said electrical component in said second current leg;
   and providing an output amplifier at an output node of said first current leg for providing said signal indicating an impedance fault of said electrical component;
   wherein said step of providing an output amplifier comprises providing an active output amplifier device connected to said output node for detecting an output voltage at said output node, providing an output inverter having an input connected to receive an output of said active output amplifier device for providing an inverted output signal, and a current source for providing a current to bias said input of said output inverter to a predetermined quiescent voltage value.

19. The method of claim 18 wherein said electrical component is a write head of a mass data storage device.

20. The method of claim 19 further comprising connecting a writer circuit to said write head for providing write current values thereto.

21. The method of claim 20 wherein said connecting a writer circuit comprises connecting an H-bridge writer.

22. The method of claim 18 wherein said differentially amplifying currents comprises providing a pair of bipolar transistors having respective bases connected to a fixed bias voltage.

23. The method of claim 22 wherein said providing a pair of bipolar transistors comprises providing a pair of NPN transistors.

24. The method of claim 18 wherein said providing an active output amplifier device comprises providing an MOS transistor.

25. The method of claim 18 further comprising providing a pair of diode in series respectively with said first and second current legs for isolating said active output amplifier devices.

26. The method of claim 18 further comprising providing a set of replicating elements in said first current leg, each replicating element being connected in parallel with a corresponding element of said first current leg.

* * * * *